(12) United States Patent
Hatanaka et al.

(10) Patent No.: US 10,573,022 B2
(45) Date of Patent: Feb. 25, 2020

(54) OBJECT RECOGNITION SYSTEM AND METHOD OF REGISTERING A NEW OBJECT

(71) Applicant: TOSHIBA TEC KABUSHIKI KAISHA, Tokyo (JP)

(72) Inventors: Yuichiro Hatanaka, Mishima Shizuoka (JP); Hitoshi Iizaka, Fuji Shizuoka (JP); Hidehiko Miyakoshi, Mishima Shizuoka (JP); Hidehiro Naito, Mishima Shizuoka (JP); Yuta Sasaki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 15/702,215

(22) Filed: Sep. 12, 2017

(65) Prior Publication Data
US 2018/0130225 A1  May 10, 2018

(30) Foreign Application Priority Data

Sep. 13, 2016 (JP) .................................. 2016-178873

(51) Int. Cl.
*G06K 9/00* (2006.01)
*H04N 7/18* (2006.01)
(Continued)

(52) U.S. Cl.
CPC .................. *G06T 7/70* (2017.01); *G06F 16/58* (2019.01); *G06F 16/5854* (2019.01);
(Continued)

(58) Field of Classification Search
USPC ....... 382/100, 103, 106, 143, 155, 162, 168, 382/172, 173, 181, 190, 219, 220, 254,
(Continued)

(56) References Cited

U.S. PATENT DOCUMENTS

2013/0141585 A1* 6/2013 Naito .................. G06Q 20/208
348/150
2013/0182899 A1* 7/2013 Naito .................. G06K 9/6201
382/103
(Continued)

FOREIGN PATENT DOCUMENTS

EP  2 423 891 A1  2/2012

OTHER PUBLICATIONS

Extended European Search Report dated Jan. 29, 2018, filed in counterpart European Patent Application No. 17190872.6 (11 pages).

*Primary Examiner* — Seyed H Azarian
(74) *Attorney, Agent, or Firm* — Kim & Stewart LLP

(57) ABSTRACT

An object recognition system includes a storage device, a reading unit, an output device, and a processor. The storage device stores a dictionary containing attributes of a plurality of registered objects. The attributes includes at least a category and feature values. The reading unit includes an image capturing device. The processor registers a new object by (i) extracting a feature value of the new object from an image of the new object captured by the image capturing device, (ii) comparing the extracted feature value with feature values of registered objects that are registered in the dictionary to calculate a similarity degree therebetween, (iii) registering the extracted feature value in the dictionary as a determination criteria for an object recognition, and (iv) outputting a notification through the output device prior to the registering, upon a result of the comparing meets a predetermined condition.

14 Claims, 8 Drawing Sheets

(51) Int. Cl.
  *G06T 7/70* (2017.01)
  *G06F 16/58* (2019.01)
  *G06F 16/583* (2019.01)
  *G06K 9/62* (2006.01)
  *G06K 9/46* (2006.01)

(52) U.S. Cl.
  CPC ......... *G06K 9/4604* (2013.01); *G06K 9/6202* (2013.01); *G06K 9/6215* (2013.01); *G06K 9/6255* (2013.01); *H04N 7/185* (2013.01); *G06K 2209/17* (2013.01)

(58) Field of Classification Search
  USPC .......... 382/276, 286–294, 305, 312; 705/23; 348/150; 707/609
  See application file for complete search history.

(56) References Cited

U.S. PATENT DOCUMENTS

| | | |
|---|---|---|
| 2014/0023241 A1 | 1/2014 | Sugasawa et al. |
| 2014/0040186 A1* | 2/2014 | Okamura ............ G06F 17/2735 707/609 |
| 2015/0023598 A1 | 1/2015 | Okamura |
| 2015/0193668 A1* | 7/2015 | Fukuda ................ G06Q 20/208 705/23 |
| 2015/0194025 A1* | 7/2015 | Tsunoda ............... G07G 1/0036 348/150 |
| 2016/0140534 A1 | 5/2016 | Iizaka |

\* cited by examiner

| | COMMODITY ID | COMMODITY CATEGORY | COMMODITY NAME | ... | UNIT PRICE | ILLUSTRATION IMAGE | IMAGE I | FEATURE VALUE Fb | AVERAGE FEATURE VALUE Fc |
|---|---|---|---|---|---|---|---|---|---|
| | f1 | f2 | f3 | | f4 | f5 | f6 | f7 | f8 |
| 1 | XXXXXXXX | VEGETABLE | AA1 | ... | 100 YEN |  | I11,I12,...,I1a | Fb11,Fb12,...,Fb1a | Fc1 |
| 2 | XXXXXXXX | VEGETABLE | AA1/2 | ... | 50 YEN |  | I21,I22,...,I2b | Fb21,Fb22,...,Fb2b | Fc2 |
| N | XXXXXXXX | FRUIT | BB1 | ... | 100 YEN |  | IN1,IN2,...,INx | FbN1,FbN2,...,FbNx | FcN |

OBJECT RECOGNITION SYSTEM AND METHOD OF REGISTERING A NEW OBJECT

CROSS-REFERENCE TO RELATED APPLICATION

This application is based upon and claims the benefit of priority from Japanese Patent Application No. P2016-178873, filed Sep. 13, 2016, the entire contents of which are incorporated herein by reference.

FIELD

Embodiments described herein relate generally to a commodity reading apparatus and a method for executing notification as to a recognition performance by the commodity reading apparatus.

BACKGROUND

Conventionally, general object recognition is proposed to be applied to a sales registration processing for sales-registering a commodity. In the general object recognition, a category of the commodity is recognized by extracting a feature value of the commodity from an image captured by photographing an appearance of the commodity and comparing the extracted feature value with prepared data for collation.

In the commodity reading apparatus using general object recognition, when additionally registering a new commodity, the dictionary for collation is updated. However, if the feature value of the new commodity is similar to that of another commodity already registered in the dictionary for collation, there is a possibility that the newly registered commodity and the commodity already registered in the dictionary for collation will cause incorrect object recognition, after the dictionary for collation is updated.

DETAILED DESCRIPTION

In accordance with an embodiment, an object recognition system includes a storage device, a reading unit, an output device, and a processor. The storage device stores a dictionary containing attributes of a plurality of registered objects. The attributes includes at least a category and feature values. The reading unit includes an image capturing device. The processor registers a new object by (i) extracting a feature value of the new object from an image of the new object captured by the image capturing device, (ii) comparing the extracted feature value with feature values of registered objects that are registered in the dictionary to calculate a similarity degree therebetween, (iii) registering the extracted feature value in the dictionary as a determination criteria for an object recognition, and (iv) outputting a notification through the output device prior to the registering, upon a result of the comparing meets a predetermined condition.

Hereinafter, an embodiment of commodity reading apparatus and a method for executing notification as to recognition performance by the commodity reading apparatus is described with reference to the accompanying drawings. The present embodiment is an example of application to a commodity reading apparatus 1 installed in a store such as a supermarket.

Figure 1:
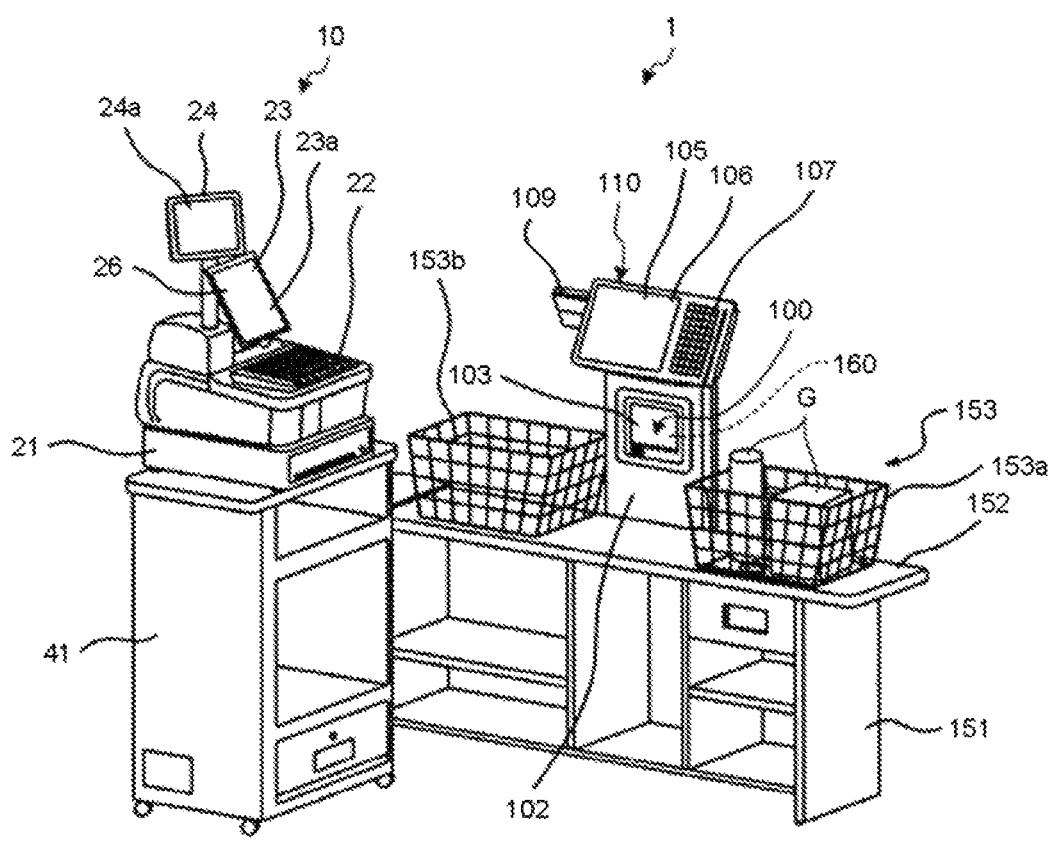
FIG. 1 is an external perspective view illustrating an example of a commodity reading apparatus according to an embodiment.

FIG. 1 is an external perspective view illustrating an example of the commodity reading apparatus 1. As shown in FIG. 1, the commodity reading apparatus 1 includes a POS (Point-of-Sale) terminal 10, a reading unit 100 and a display and operation unit 110.

The POS terminal 10 registers a commodity G, i.e., a registration target. The POS terminal 10 specifies the commodity read by the reading unit 100 based on a feature value Fa of the commodity G output by the reading unit 100, and executes a sales registration processing and a settlement processing.

The reading unit 100 captures an image of the commodity G at the time of executing the sales registration and reads out the feature value Fa of the image of the photographed commodity G.

The display and operation unit 110 displays the image captured by the reading unit 100 and also displays various information output by the POS terminal 10. The display and operation unit 110 receives various operation inputs by a store clerk, and transfers the operation input information to the POS terminal 10.

In FIG. 1, the POS terminal 10 is placed on a drawer 21 on a register table 41. The POS terminal 10 is provided with a keyboard 22 on which press keys for operation are arranged on the upper surface thereof. The POS terminal 10 includes a first display device 23 used by the store clerk to confirm registration information and to input information necessary for settlement and a second display device 24 used by a customer to confirm the registration information. For example, the second display device 24 is positioned above the keyboard 22. The first display device 23 has a display panel 23a such as a liquid crystal panel, and is a touch input type formed by overlaying a touch panel 26 on the display panel 23a. The second display device 24 has a display panel 24a such as a liquid crystal panel. The second display device 24 is vertically arranged in a rotatable manner to a direction at which the customer can easily see the screen of the device 24 at the upper part of the POS terminal 10. The drawer 21 stores bills and coins therein and is opened according to an instruction from the POS terminal 10.

A checkout counter 151 forming an L-shape with the register table 41 is arranged next to the register table 41. A receiving surface 152 for placing a shopping basket 153 is formed on the upper surface of the checkout counter 151. In FIG. 1, a first shopping basket 153a and a second shopping basket 153b are placed on the checkout counter 151. The first shopping basket 153a in which commodities G are placed prior to reading is brought by a customer onto the receiving surface 152. The second shopping basket 153b is used to house the commodities G already read. The store clerk picks up the commodities G before reading from the first shopping basket 153a and moves the commodities G to the second shopping basket 153b after the commodities G are read one by one in the commodity reading apparatus 1. The shopping basket is not limited to a basket shape, but may be a tray shape, a box shape, a bag shape and the like.

The reading unit 100 is vertically arranged at almost the center of the receiving surface 152 of the checkout counter 151 and is electrically connected to the POS terminal 10 to be capable of transmitting and receiving data in a wired or wireless manner. The reading unit 100 is arranged at the rear side of a reading window 103 which is provided on the surface of a housing 102 to face the store clerk side. The reading window 103 is formed of, for example, a transparent glass plate or the like having translucency. The reading unit 100 has an image capturing device 160 for photographing the commodity G at the back of the reading window 103. If the commodity G is photographed by the image capturing device 160, the reading unit 100 outputs the image of the photographed commodity G and feature value Fa of the commodity G extracted from the image to the POS terminal 10.

The display and operation unit 110 is arranged at the top of the housing 102 of the reading unit 100. The display and operation unit 110 has a third display device 106 for store clerk such as a liquid crystal panel. The display and operation unit 110 is used by the store clerk to confirm the image captured by the reading unit 100 and to input information necessary for the operation of the commodity reading apparatus 1. The display and operation unit 110 displays, on the third display device 106, various information output from the POS terminal 10, for example, a reading result of the commodity G or a warning screen on which reading performance of the commodity G decreases or the reading performance does not improve at the time the commodity G is registered as a registration target commodity. The touch panel 105 is laminated on the screen of the third display device 106 and information necessary for operating the commodity reading apparatus 1 can be input through the touch panel 105. Further, a keyboard 107 is provided at the right side of the third display device 106 so that the store clerk can suitably operate the keyboard. The display and operation unit 110 has a fourth display device 109 for customer to confirm the reading result of the commodity G at the back surface side (which is the customer side) of the reading window 103.

Figure 2:
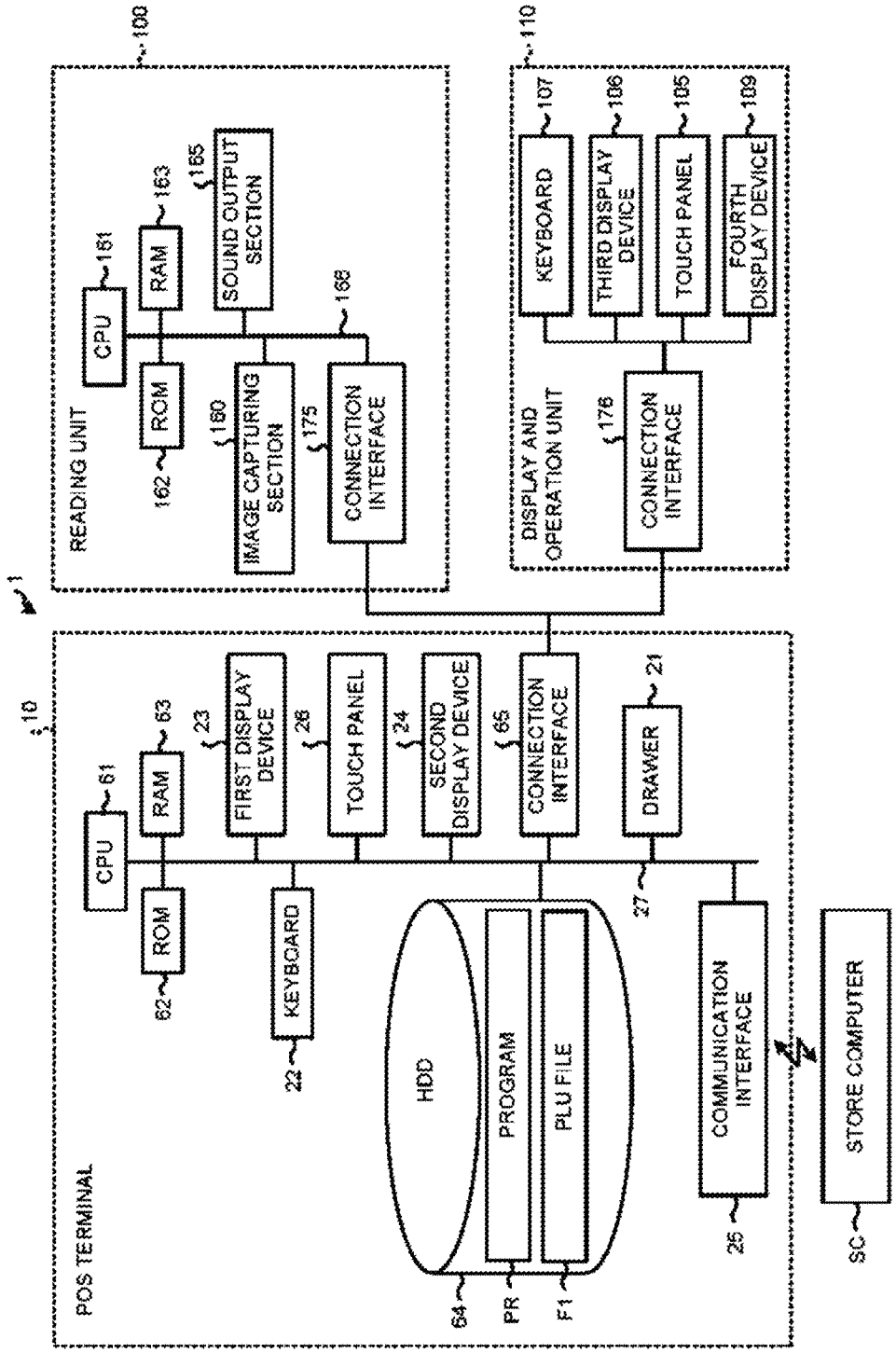
FIG. 2 is a block diagram illustrating an example of the hardware structure of the commodity reading apparatus.

The hardware structure of the commodity reading apparatus 1 is described. FIG. 2 is a block diagram illustrating the hardware structure of the commodity reading apparatus 1. The POS terminal 10 of the commodity reading apparatus 1 includes a CPU (Central Processing Unit) 61, a ROM (Read Only Memory) 62, a RAM (Random Access Memory) 63, an HDD (Hard Disk Drive) 64, a connection interface 65, the drawer 21, the keyboard 22, the first display device 23, the second display device 24, a communication interface 25, and a touch panel 26. The CPU 61, the ROM 62, the RAM 63 and the HDD 64 are connected by an internal bus line 27. The drawer 21, the keyboard 22, the first display device 23, the second display device 24, the communication interface 25, the touch panel 26, the HDD 64 and the connection interface 65 are all connected to the above internal bus line 27 via various input and output circuits (not illustrated).

The CPU 61 is a central processing unit for controlling the entire functional sections and elements of the POS terminal 10. The ROM 62 is a nonvolatile memory for storing fixed programs. The RAM 63 is a volatile memory used by the CPU 61 as a work area.

The HDD 64 is a storage section for storing various programs and various files. Various programs include a program PR for a commodity sales data processing including a processing of determining commodity candidates and displaying information indicating the commodity candidates on a selection screen while controlling the entire operation of the POS terminal 10. The detail of the determination of the commodity candidates will be explained later. The various files include a PLU file F1 delivered from a store computer SC to be stored. In the HDD 64, a registration table and a sales table are stored for registering the commodity. The POS terminal 10 has a constitution of a general computer system in which the CPU 61 acting as a control main body reads the program PR to execute it.

The communication interface 25 is composed of a network card for executing a data communication with the store computer SC. For example, the store computer SC is installed in a back office of a store. The store computer SC stores the PLU file F1 in the HDD (not shown) to deliver it to the POS terminal 10.

The connection interface 65 communicates with a connection interface 175 of the reading unit 100 and a connection interface 176 of the display and operation unit 110. The communication is executed in a wired or wireless manner.

The reading unit 100 of the commodity reading apparatus 1 includes a CPU 161, a ROM 162, a RAM 163, an image capturing device 160, a sound output section 165, and the connection interface 175. The display and operation unit 110 of the commodity reading apparatus 1 includes the connection interface 176, a touch panel 105, the third display device 106, a keyboard 107, and the fourth display device 109.

The CPU 161, the ROM 162 and the RAM 163 are connected via an internal bus line 166. The image capturing device 160, the sound output section 165 and the connection interface 175 are all connected to the above internal bus line 166 via various input and output circuits (not illustrated). The touch panel 105, the third display device 106, the keyboard 107 and the fourth display device 109 are connected to the connection interface 176 via various input and output circuits (not illustrated).

The CPU 161 is a central processing unit that controls the reading unit 100. The ROM 162 is a nonvolatile memory for storing control programs of the reading unit 100. The control programs include a program for executing a processing of extracting a feature value F from an image I of the photographed commodity G and outputting the extracted feature value F to the POS terminal 10. The RAM 163 is a volatile memory used by the CPU 161 as a work area. The reading unit 100 has a constitution of a general computer system in which the CPU 161 acting as a control main body reads out the control programs from the ROM 162 or the HDD 64 to execute them.

The image capturing device 160 includes a color image sensor having an image capturing element such as a CCD (Charge Coupled Device) or a CMOS (Complementary Metal Oxide Semiconductor). The image capturing device 160 starts image capturing by receiving an image capturing start signal from the CPU 161, converts the commodity G held over the reading window 103 to an electric signal at a predetermined frame rate (for example, 30 fps), and sequentially outputs the captured image I.

The sound output section 165 has a regeneration circuit and a speaker for regenerating a preset reading sound (e.g., "beep"), a warning sound, and voice. The sound output section 165 regenerates the reading sound, the warning sound, and the voice by a control signal from the CPU 161, to inform the store clerk of a reading state of the commodity G by the sound.

Furthermore, the connection interface 175 is connected to the CPU 161. The connection interface 175 connects with the connection interface 65 of the POS terminal 10 to execute data transmission and reception between the reading unit 100 and the POS terminal 10.

The connection interface 176 connects with the connection interface 65 of the POS terminal 10 to execute data transmission and reception between the display and operation unit 110 and the POS terminal 10. The connection interface 176 also connects with the connection interface 175 to execute data transmission and reception between the display and operation unit 110 and the reading unit 100.

Figure 3:
FIG. 3 is a conceptual diagram illustrating an example of the data structure of a PLU file.
Figure 3:
Figure 3:

The PLU file F1 included in the POS terminal 10 is described with reference to FIG. 3. The PLU file F1 is an example of a dictionary and acts as a storage module 71 described later. FIG. 3 is a diagram illustrating an example of the data structure of the PLU file F1. The PLU file F1 is a data file in which commodity information, an image I obtained by photographing the appearance of the commodity G and the feature value F extracted from the image I are associated with each other for each commodity G. In the PLU file F1, information of N kinds of commodities G is registered. Specifically, the commodity information, the image I and the feature value F serving as a value indicating the feature of the commodity G extracted from the image I are stored in association with each other for each commodity. In the example in FIG. 3, data shown in a commodity ID column f1, data shown in a commodity category column f2, data shown in a commodity name column f3, data shown in a unit price column f4, and data shown in an illustration image column f5 are respectively stored as the commodity information. Further, data in an image column f6 for storing the image I of the appearance of the commodity, data in a feature value column f7 for storing feature value Fb extracted from the image I and data in an average feature value column f8 described later are associated with the commodity information described above. As described below, a plurality of images I is stored in the image column f6 for one commodity ID. The feature value Fb extracted from each image I is stored in the feature value column f7.

In a case in which one commodity G is registered as the recognition target article in the PLU file F1, a plurality of images I obtained by photographing the same commodity from various directions or the images I of plural commodities belonging to the same category are captured so that each commodity is recognized more accurately. In other words, the image column f6 of the PLU file F1 stores a plurality of images I. Hereinafter, the images stored in the image column f6 are collectively referred to as the image I, and if it is necessary to separately express the plurality of images, the images are respectively expressed as images Inm (n=1 N). The image Inm indicates the "m-th" image obtained by photographing the appearance of the commodity having the commodity ID "n".

The feature value Fb stored in the feature value column f7 of the PLU file F1 is, for example, a surface state (e.g., texture) of the commodity G such as a tint and an unevenness of the surface extracted from the image I. Each feature value Fb extracted from each of the plurality of images Inm belonging to a certain commodity ID is stored in association with the corresponding image Inm. In other words, the feature value Fbnm (n=1~N) extracted from the image Inm is stored in an associated manner in the feature value column f7. The feature value Fbnm indicates feature value extracted from the "m-th" image captured by photographing the appearance of the commodity of which the commodity ID is "n". Hereafter, the second feature value stored in the feature value column f7 is collectively referred to as the feature value Fb and if it is necessary to separately express a plurality of the feature value, each of the second feature value is expressed as the feature value Fbnm (n=1~N).

In the average feature value column f8 of the PLU file F1, an average feature value Fc obtained by averaging the feature value Fbnm is stored. Specifically, an average feature value Fcn (n=1~N) is stored in the column corresponding to the commodity whose commodity ID is "n" of the feature value column f8. The average feature value Fcn (n=1~N) is used to calculate a similarity degree C. between the feature value Fa extracted by an extraction module 53 (described later) from an image obtained by photographing the appearance of the commodity purchased by the customer and the average feature value Fcn at the time the commodity reading apparatus 1 specifies the commodity to execute the normal sales registration processing.

In addition, by additionally registering an image Io of the unregistered new commodity G to the PLU file F1, the category of the commodity G becoming the recognition target of the commodity reading apparatus 1 can be expanded. The performance of the commodity reading apparatus 1 to recognize commodity G can also be improved by additionally registering a new image Ic of the commodity G already registered in the PLU file F1. The detailed description of the above is made below.

(Functional Components of the Commodity Reading Apparatus)

Figure 4:
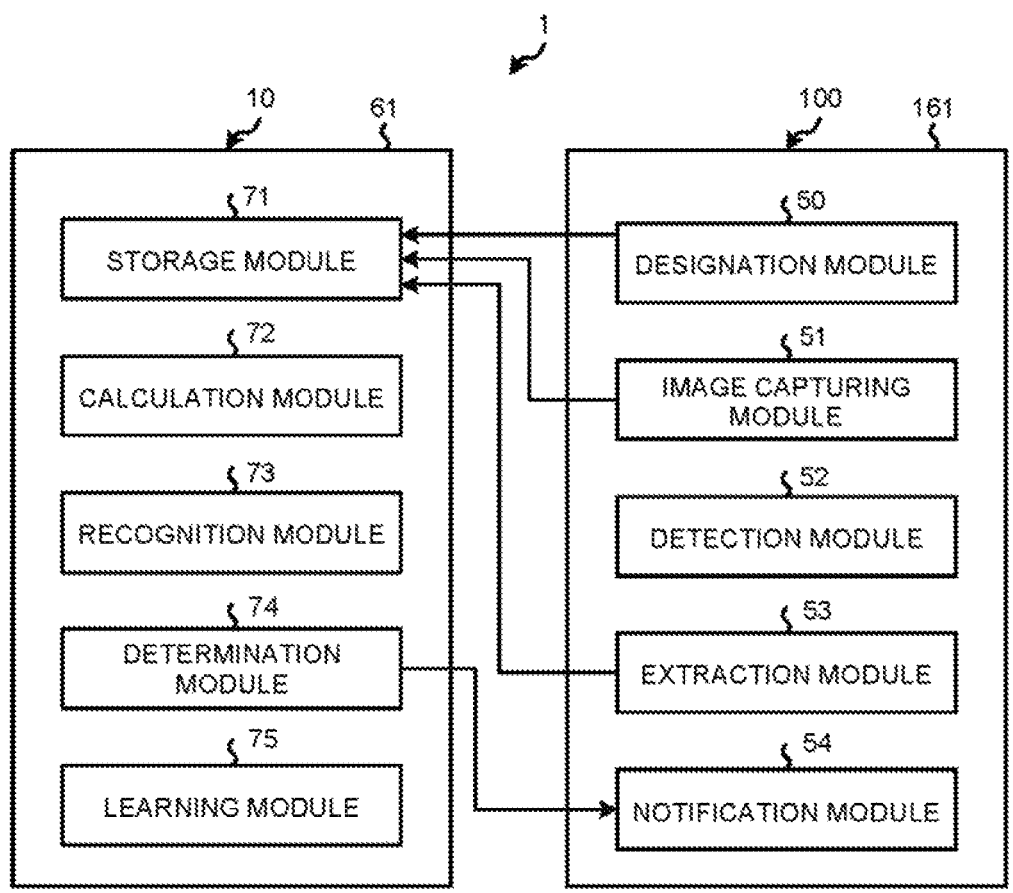
FIG. 4 is a block diagram illustrating an example of the functional components of the commodity reading apparatus.

Next, the functional components of the commodity reading apparatus 1 are described. FIG. 4 is a functional block diagram illustrating an example of the constitution of the functional block of the commodity reading apparatus 1. The functional block diagram in FIG. 4 only shows the distinctive functions of the present invention in all the functions of the commodity reading apparatus 1, as an example. In the commodity reading apparatus 1, the CPU 161 shown in FIG. 2 appropriately executes the program stored in the ROM 162. As a result, a designation module 50, an image capturing module 51, a detection module 52, the extraction module 53 and a notification module 54 are realized as the functional sections of the CPU 161 constituting the reading unit 100.

Furthermore, in the commodity reading apparatus 1, the CPU 61 shown in FIG. 2 executes the program stored in the ROM 62 and the program PR stored in the HDD 64. As a result, a storage module 71, a calculation module 72, a recognition module 73, a determination module 74 and a learning module 75 are realized as functional sections of the CPU 61.

Next, the functional components of the reading unit 100 are described. The designation module 50 designates the commodity G as the learning target article. In a case of designating the learning target article, as described above, there are two cases. The first case is that the commodity G of a category that is not stored in the PLU file F1 is designated as the learning target article of the new category. In this way, by registering the new commodity G in the new category, the commodity reading apparatus 1 can recognize the new commodity G. The second case is that the commodity G belonging to the existing category is designated as the learning target article belonging to the existing category already stored in the PLU file F1. In this way, by additionally registering the commodity G registered in the PLU file F1, the number of the feature value concerning the commodity G increases, and thus the commodity reading apparatus 1 can improve the recognition performance of the commodity G.

Specifically, the designation module 50 designates the learning target article based on the operation information through the touch panel 105 or the keyboard 107 of the display and operation unit 110 (FIG. 1).

The image capturing module 51 outputs an image capture start signal to the image capturing device 160 (FIG. 2) to start an image capturing operation by the image capturing device 160. Thereafter, the image capturing module 51 sequentially stores the captured images I outputted by the image capturing device 160 in the RAM 163 (FIG. 2).

The detection module 52 detects that the commodity G is held over the reading window 103 (FIG. 1) based on a plurality of consecutive captured images I outputted by the image capturing device 160. Specifically, the detection module 52 reads out the images I output by the image capturing device 160 from the RAM 163, and compares luminance of the read image with that of the image I (latest image) read out right before it is read. The detection module 52 determines that it is the image I including some article such as a hand, and/or the commodity G if any change of the luminance gradation between the two images is detected as a result of the comparison of the luminance. Furthermore, the detection module 52 binarizes each of the image I having the article and the consecutive images I, and then extracts a contour line of the commodity G from the images. If there is a change in the position of the contour line of the consecutive images I, the detection module 52 specifies that an area within the contour line indicates the commodity G held over the reading window 103. Thus, the detection module 52 detects that the commodity G is held over the reading window 103.

The method of specifying that the commodity G is held over the reading window 103 is not limited to the above method, and other methods may be used. For example, instead of the contour line of the commodity G in the image I, the presence or absence of a flesh color region is used to specify that the commodity G is held over the reading window 103. If there is the flesh color region in the image I, it is presumed that the flesh color region represents a hand of the store clerk. Therefore, for example, the contour line is extracted from the image I and an area inside the contour line at the position where it is presumed that the commodity G is gripped in the contour lines indicating the shape of the hand may be specified as an area indicating the commodity G.

The extraction module 53 extracts the feature value Fa of the recognition target commodity with the object recognition from the area representing the commodity G in the image I. Then, the extraction module 53 outputs the extracted feature value Fa to the POS terminal 10. Specifically, the extraction module 53 reads out data of the image I from the RAM 163. Then, the extraction module 53 specifies the area of the commodity G from the image I. The extraction module 53 extracts the feature value Fa with respect to the inside of the specified area representing the commodity G. The extraction module 53 outputs the extracted feature value Fa to the connection interface 175 (FIG. 2). The connection interface 175 outputs the received feature value Fa to the connection interface 65 (FIG. 2), and notifies the feature value Fa from the connection interface 65 to the PLU file F1.

The notification module 54 notifies that there is a possibility of degrading the recognition performance of the recognition module 73 described later or that there is less possibility of improving the recognition performance by a learning processing of the learning module 75 described later prior to the execution of the learning processing. The detailed description is made below.

Next, the functional components of the POS terminal 10 are described. The storage module 71 comprises the aforementioned PLU file F1. As described above, the PLU file F1, an example of a dictionary, stores the image I of each registered commodity in the dictionary and the feature value Fb indicating the feature of each registered commodity. The storage module 71 specifies the commodity G, photographed in the image I captured by the image capturing module 51, which is referred if the recognition module 73 described later executes the object recognition.

The calculation module 72 calculates the similarity degree C. between the feature value Fa extracted from the image I captured by the image capturing module 51 and the feature value Fb of each commodity stored in the storage module 71.

The recognition module 73 executes the object recognition processing for recognizing the commodity G in the image I. Specifically, the recognition module 73 selects a commodity of which the similarity degree C. is equal to or greater than a predetermined threshold value C1 (first threshold value) from the PLU file F1 based on the similarity degree C. between the feature value Fa extracted by the extraction module 53 from the image I including the commodity G captured by the image capturing device 160 and the average feature value Fcn of each commodity stored in the PLU file F1. Then, the recognition module 73 recognizes that the unknown commodity G corresponds to which one of the commodities G registered in the PLU file F1.

The object recognition for recognizing the commodity G contained in an image is referred to as a general object recognition. Various recognition technologies used in the general object recognition are described in detail in the following documents, and therefore the description thereof is omitted herein.

The similarity degree C. used in the case in which the recognition module 73 executes the object recognition to specify the commodity G is a scale showing how much similar the feature value Fbnm stored in the feature value column f7 of each commodity G in the PLU file F1 or the average feature value Fcn stored in the average feature value column f8 and the feature value Fa of the commodity G in the image I are. The similarity degree C. may be calculated as an absolute evaluation value, i.e., 100%="similarity degree: 1.0", or may be calculated as a relative evaluation value.

For example, in a case in which the similarity degree C. is calculated as the absolute evaluation value, the feature value Fa of the commodity G in the image I and the feature value Fbnm of each commodity G registered in the PLU file F1 or the average feature value Fcn (n=1~N) are compared one by one, and the similarity degree C. calculated as a result of the comparison is accepted. If the similarity degree 95% is set to the first threshold value C1, the recognition module 73 carries out a ranking in which the commodities having the similarity degree C. of 95% or more are ranked in the descending order of the similarity degree C. and sets them as candidates of the commodity G.

On the other hand, in a case in which the similarity degree is calculated with the relative evaluation, the similarity degree C. is calculated in such a manner that the sum of the similarity degrees C. of each commodity in the PLU file F1 becomes 1.0 (100%). For example, in a case in which five commodities (e.g., first commodity, second commodity, third commodity, fourth commodity and fifth commodity) are registered in the PLU file F1, each similarity degree is set such, for example, that the similarity degree with respect to the first commodity is 0.6, the similarity degree with respect to the second commodity is 0.1, the similarity degree with respect to the third commodity is 0.1, the similarity degree with respect to the fourth commodity is 0.1, the similarity degree with respect to the fifth commodity is 0.1, and thus the sum of the similarity degrees C. is always 1.0. For example, in a case in which the similarity degree 0.5 is set as the first threshold value C1, the recognition module 73 performs a ranking in which the commodities having the similarity degree C. of 0.5 or more are selected in the descending order of the similarity degree C., and sets them as candidates of the commodity G. In the above example, it is determined that the first commodity is the candidate for the commodity G.

In a case in which the image Io of the unregistered new article G is additionally registered in the storage module 71 as a new category or the new image Ic of the commodity G is additionally registered in the existing category, the determination module 74 determines whether there is a possibility that the recognition performance of the recognition module 73 is degraded or is not improved.

The registration of the image Io of the new category in the PLU file F1 refers to the registration of a new commodity information in the commodity ID column f1, the commodity category column f2, the commodity name column f3, the unit price column f4 and the illustration image column f5 in the PLU file F1 (FIG. 3), and furthermore the registration of the new image Io in the image column f6. In general, a plurality of new images Io are additionally registered. In the case of registering the new image Io, the feature value Fa is extracted from the new images Io, and the extracted feature value Fa is stored in the feature value column f7 to be set as the second feature value Fb at the same time. Furthermore, the average feature value Fc is calculated and stored in the average feature value column f8. More specifically, if "one AA" and "½ of AA" are registered as the commodity in the PLU file F1, for example, a case in which "¼ of AA" is registered as the new commodity means that a new category is being additionally registered.

The additional registration of the new image Ic belonging to existing category refers to the additional registration of the new image Ic in the image column f6 of the commodity already registered in PLU file F1 (FIG. 3). Such additional registration of the new image Ic in the existing category is carried out if it is desired to improve the recognition performance of the commodity.

Generally, at the time of additionally registering the commodity G that is unregistered in the dictionary as a new category in the dictionary, in order to recognize the commodity G to be additionally registered with a high recognition accuracy, it is desirable that the feature value extracted from the image of the commodity G newly registered (referred to hereinafter as the first feature amount) and the feature value of the commodity already registered in the dictionary (referred to herein as the second feature amount) can be easily distinguished from one the other. At the time the similarity degree C. between the first feature value and the second feature value is calculated, it is desirable that the similarity degree C. is as low as possible. Conversely, if the similarity degree C. between the first feature value and the second feature value is higher than a predetermined threshold value, there is a high possibility that the unregistered commodity G is erroneously recognized as the already registered commodity G. Therefore, at the time the determination module 74 registers the unregistered commodity G as the new category in the storage module 71 (in particular, in the PLU file F1) based on the similarity degree C. between the first feature value and the second feature value, it is determined whether there is a possibility of degrading the recognition performance. A detailed determination method is described later.

At the time the new image of the commodity G belonging to the existing category is additionally registered in the existing category of the commodity G registered in the dictionary, in order to reliably recognize the commodity G, using the dictionary in which the new image is additionally registered, it is desirable that the first feature value which is extracted from the new image of the commodity G to be additionally registered and the second feature value which is of the commodity G already registered in the dictionary are as similar as possible. Conversely, if the similarity degree C. between the first feature value and the second feature value is lower than a predetermined threshold value (in a case in which the registered image and the new image additionally registered are dissimilar), at the time the recognition module 73 executes the object recognition, there is a possibility of degrading the recognition performance of the registered commodity G. Therefore, based on the similarity degree C. between the first feature value and the second feature value, the determination module 74 determines whether there is a possibility of degrading the recognition performance at the time of additionally registering the new image of the commodity G belonging to the existing category in the existing category of the commodity G registered in the dictionary. A detailed determination method is described later.

The learning module 75 executes the learning processing of registering the feature value Fa of the commodity G extracted by the extraction module 53 as the feature value Fb of the learning target article in the storage module 71 (in particular, in the PLU file F1). The learning module 75 controls whether to execute the registration of the new image in a case of additionally registering the image Io of the new category in the storage module 71 or in a case of additionally registering the new image Ic in the existing category.

(Flow of Processing of Registering the Image of New Category in the Commodity Reading Apparatus)

Hereinafter, the operation executed by the commodity reading apparatus 1 according to the embodiment is described by being classified into an operation of additionally registering the image Io of the commodity G of the new category in the PLU file F1 serving as the storage module 71, and an operation of additionally registering the new image Ic of the commodity G belonging to the existing category in the existing category of the PLU file F1 serving as the storage module 71.

Figure 5:
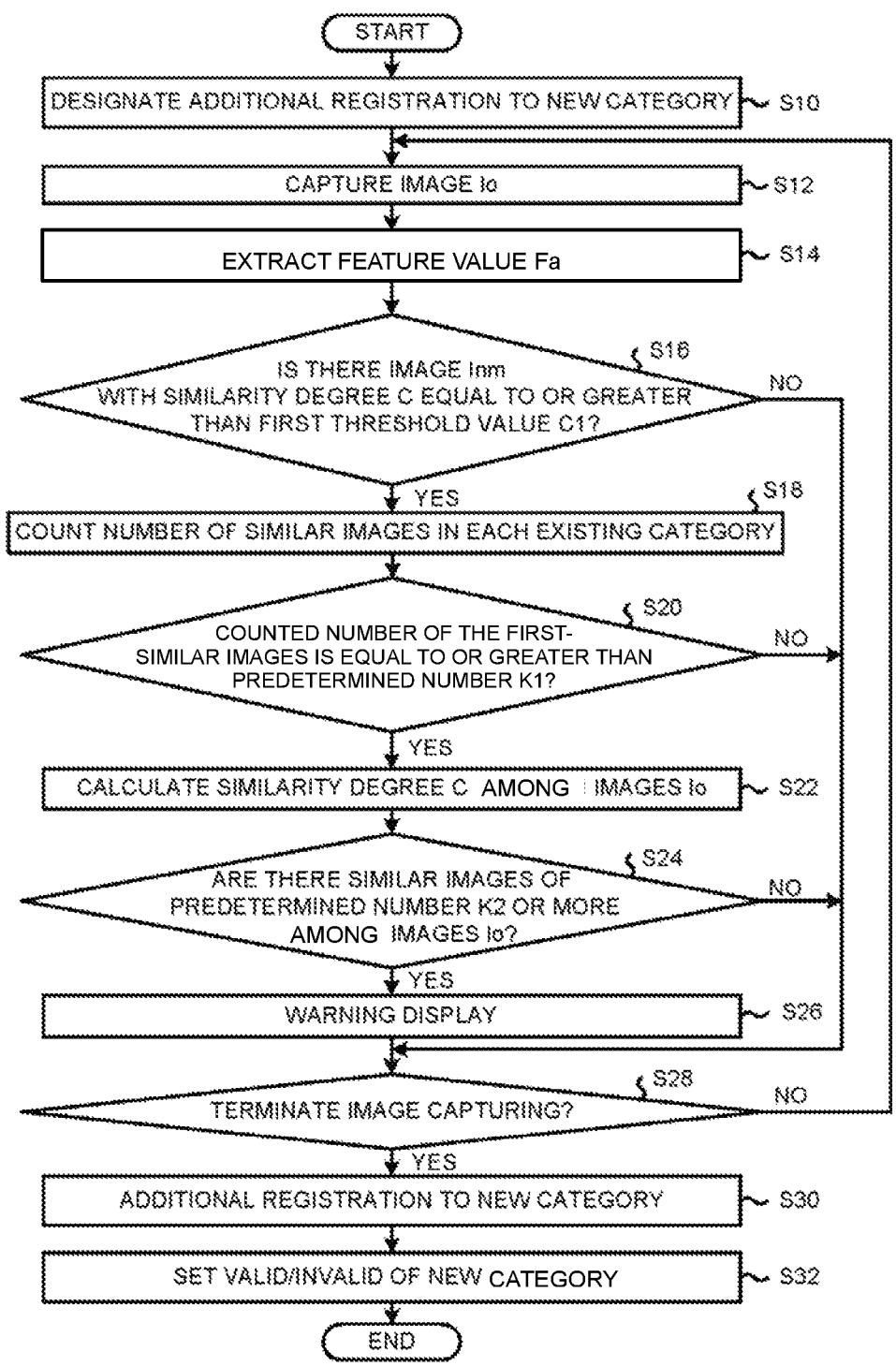
FIG. 5 is a flowchart illustrating a flow of additionally registering an image of a new category to the commodity reading apparatus.

First, with reference to FIG. 5, the flow of the operation of additionally registering the image Io of the new category in the PLU file F1 by the commodity reading apparatus 1 is described. FIG. 5 is a flowchart illustrating the processing of additionally registering the image Io of the new category in the commodity reading apparatus 1. First, in Act S10, the designation module 50 designates that the additional registration in the new category is executed based on, for example, the operation input to the touch panel 105 or the keyboard 107 of the display and operation unit 110 (FIG. 1) by the store clerk. Specifically, the designation module 50 designates the new category and the learning target article to be additionally registered in the PLU file F1.

Next, in Act S12, the image capturing module 51 captures the image Io of the commodity G to be additionally registered as the new category. In general, in Act S12, the image capturing module 51 captures a plurality of images Io of the commodity G.

Subsequently, in Act S14, the extraction module 53 extracts the feature value Fa from each of the plurality of captured images Io.

In Act S16, the calculation module 72 first calculates the similarity degree C. between the feature value Fb registered in each existing category in the PLU file F1 and the feature value Fa of each of the plurality of captured images Io to be additionally registered in the new category. Then, the determination module 74 determines whether there is the image Inm (n=1~N) having the similarity degree C. equal to or greater than the first threshold value C1 with any one of the feature values Fa of the images Inm corresponding to the existing categories. The first threshold value C1 may be set to an arbitrary value, however, it is desirable to set the first threshold value C1 to a relatively high value (for example, 80% in a case where the similarity degree C. is calculated by the relative evaluation). If it is determined that there is at least one image Inm having the similarity degree C. equal to or greater than the first threshold value C1 (Yes in Act S16), the flow proceeds to the processing in Act S18, otherwise the flow proceeds to the processing in Act S28 (No in Act S16).

Subsequently, in Act S18, the calculation module 72 counts the number of images Inm similar to any one of the images Io out of the images Inm registered in each existing category, i.e., the number of images Inm having the similarity degree C. equal to or greater than the first threshold value C1, and hereinafter, referred to as a first similar image.

In Act S20, the determination module 74 determines whether counted number of the first similar images is equal to or greater than predetermined number K1 based on the counting result in Act S18. If it is determined that the counted number of the first similar images is equal to or greater than the predetermined number K1 (Yes in Act S20), the flow proceeds to the processing in Act S22, otherwise the flow proceeds to the processing in Act S28 (No in Act S20). Since the number of images Inm registered corresponding to each category may be different according to the category thereof, the number of images K1 used for determination in Act S20 accounts for a predetermined ratio (for example, 30% or more) or more of the total number of images registered in entire existing categories.

In Act S22, the calculation module 72 calculates the similarity degree C. among the plurality of images Io captured in Act S12.

In Act S24, the determination module 74 determines whether or not there are similar images of a predetermined number of images K2 or more in the plurality of images Io based on the similarity degree C. among the plurality of images Io to be registered in the new category. If it is determined that the number of images similar to each other among the plurality of images Io is equal to or greater than K2 (Yes in Act S24), the flow proceeds to the processing in Act S26, otherwise the flow proceeds to the processing in Act S28 (No in Act S24). The determination module 74 determines that the images Io includes images similar each other if the similarity degree C., which is the similarity degree between the feature values Fa extracted from the plurality of images Io, among the plurality of images Io is equal to or greater than a third threshold value C3. The third threshold value C3 may be set to an arbitrary value regardless of the first threshold value C1 described above, but it is desirable to set the third threshold value C3 to a relatively high value (for example, 70% or more if the similarity degree C. is calculated by the relative evaluation). In order to be distinguished from the first similar image determined to be similar based on the similarity degree C. calculated in Act S16, similar images determined to be similar in Act S24 are referred to as second similar images below. Since the number of images Io to be registered in the new category varies depending on circumstances, the number of images K2 used for determination in Act S24 accounts for a predetermined ratio (for example, 20% or more) or more of the total number of images to be registered in the new category.

In Act S24, if it is determined that number of the second similar images among the plurality of images Io is equal to or greater than K2, the determination module 74 instructs the notification module 54 to carry out notification by displaying a warning in Act S26. Then, the notification module 54 notifies that there is a possibility of degrading the recognition performance of the recognition module 73 if the images Io similar each other are registered corresponding to the new category. Thereafter, the commodity reading apparatus 1 executes the processing in Act S28.

In Act S28, the image capturing module 51 determines whether or not the image capturing of the image Io is terminated. Specifically, the image capturing module 51 determines whether or not an instruction to terminate the image capturing of the image Io is input via the display and operation unit 110. In the case of terminating the image capturing of the image Io (Yes in Act S28), in other words, if the instruction to terminate the image capturing of the image Io is input via the display and operation unit 110, the flow proceeds to the processing in Act S30, otherwise the flow returns to the processing in Act S12 (No in Act S28).

Subsequently, in Act S30, the learning module 75 additionally registers the feature value Fa of the image Io and the image Io in the new category of the PLU file F1 serving as the storage module 71. The feature value Fa is registered as the second feature value Fb in the PLU file F1. Even if the notification is given by the warning display in Act S26, the additional registration by the learning module 75 is executed unconditionally. However, whether the additionally registered information is utilized or not is set in Act S32 described later.

Next, in Act S32, the learning module 75 sets a validity (valid/invalid) of the new category additionally registered in Act S30. If the new category is set to be valid, the recognition module 73 can access the new category registered in the PLU file F1. The new category is set as the recognition target of the commodity reading apparatus 1. Furthermore, if the new category is set to be invalid, the recognition module 73 cannot access the new category registered in the PLU file F1. The new category is not set as the recognition target of the commodity reading apparatus 1. Specifically, the processing in Act S32 is executed by operating the touch panel 105 or the keyboard 107 of the display and operation unit 110 (FIG. 1) by the store clerk. Then, the commodity reading apparatus 1 completes the processing in FIG. 5 after executing the processing in Act S32.

Figure 6:
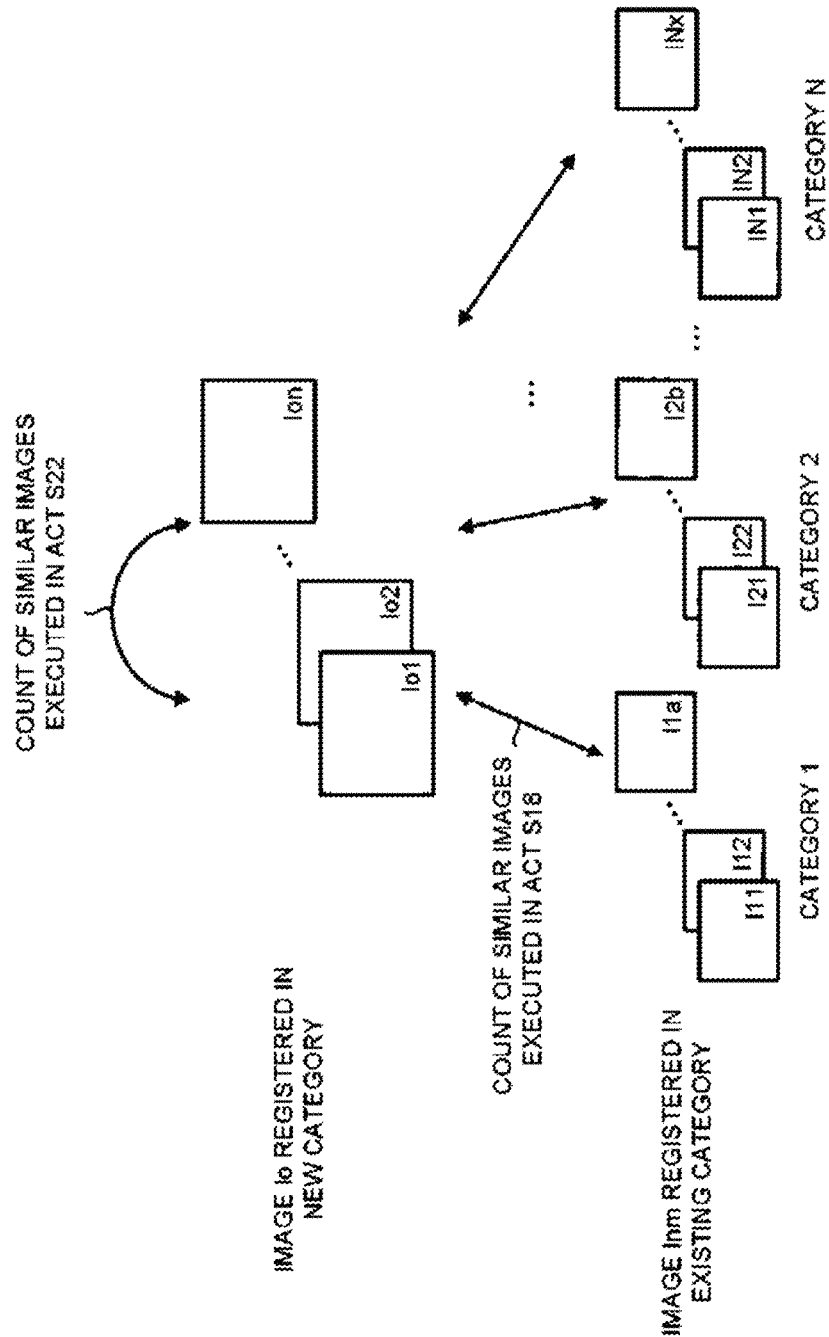
FIG. 6 is a diagram illustrating a method of counting the number of similar images executed in the flowchart in FIG. 5.

The method of counting the number of first similar images executed in Act S18 and the method of counting the number of second similar images executed in Act S22 are described in more detail with reference to FIG. 6. FIG. 6 is a diagram illustrating the method of counting the number of similar images (first similar images and the second similar images).

As shown in FIG. 6, in Act S18 (FIG. 5), the calculation module 72 calculates the similarity degree C. between the image Io (Io1, Io2, . . . , Ion) additionally registered and the image Inm (n=1~N) already registered in the existing category n. Then, the calculation module 72 counts the number of first similar images having the similarity degree C. equal to or greater than the first threshold value C1 for each category (category 1, category 2, . . . , category N).

In the case of additionally registering n images Io in the new category, in the Act S18, for example, the similarity degree is calculated for b*n times for the existing category 2 in which b images are stored.

In Act S22 (FIG. 5), the calculation module 72 calculates the similarity degree C. between the images Io (Io1, Io2, . . . , Ion) to be additionally registered. Then, the calculation module 72 calculates the number of second similar images having the similarity degree C. equal to or greater than the first threshold value C1.

In Act S22, for example, in the case of additionally registering n images Io in the new category, the calculation module 72 calculates the similarity degree for nC2 times.

In the flowchart in FIG. 5, it is determined whether there is the existing category in which the first similar images, similar to the image Io, the number of which is equal to or greater than K1 are registered in Act S20. Then, in Act S24, it is determined whether there are second similar images the number of which is equal to or greater than K2 in the plurality of newly registered images Io. As a result, on condition that there is the existing category in which the first similar images, similar to the image Io, the number of which is equal to or greater than K1 are registered and there are second similar images the number of which is equal to or greater than K2 in the plurality of images Io, the determination module 74 notifies through the notification module 51 that there is a possibility of degrading the recognition performance. This is because that if there is an image similar to the image Inm registered in the existing category in the newly registered images Io, the feature value Fa extracted from the image Io and the feature value Fb extracted from the image Inm are close, and resulting that there is a high possibility that the new commodity G is erroneously recognized as the commodity already registered in the existing category at the time the recognition module 73 executes the object recognition. If there are many similar images among the plurality of images Io obtained by photographing the newly registered commodity G, even if the plurality of images Io of the commodity G of the new category is additionally registered, there is less possibility of achieving a high recognition performance. If there are many similar images among the newly registered images Io, there is a possibility that the images Io of the commodity G are unbalanced in distribution. If the commodity G belonging to the newly registered category is read by the commodity reading apparatus 1 at the time the recognition module 73 executes the object recognition, there is a possibility of erroneously recognizing the commodity G as the commodity in another category.

The determination processing executed in Act S20 and Act S24 may be simplified. In Act S16, at the time the similarity degree C. between the newly registered image Io and the image Inm registered in the existing category is calculated, the determination module 74 may notify through the notification module 54 that there is a possibility of degrading the recognition performance of the recognition module 73 when the image Inm having the similarity degree equal to or greater than the first threshold value C1 is found in the registered categories (Yes in Act S16). In this case, in the flowchart in FIG. 5, execution of each processing in Act S18, S20, S22 and S24 is not required.

Furthermore, in Act S20, the determination module 74 may notify through the notification module 54 that there is a possibility of degrading the recognition performance of the recognition module 73 on condition that there is the existing category in which the first similar images equal to or greater than the number of images K1 to the image Io are registered (Yes in Act S20). In this case, in the flowchart in FIG. 5, execution of each processing in Act S22 and S24 is unnecessary.

(Flow of the Processing of Registering a New Image in the Existing Category of the Commodity Reading Apparatus)

Figure 7:
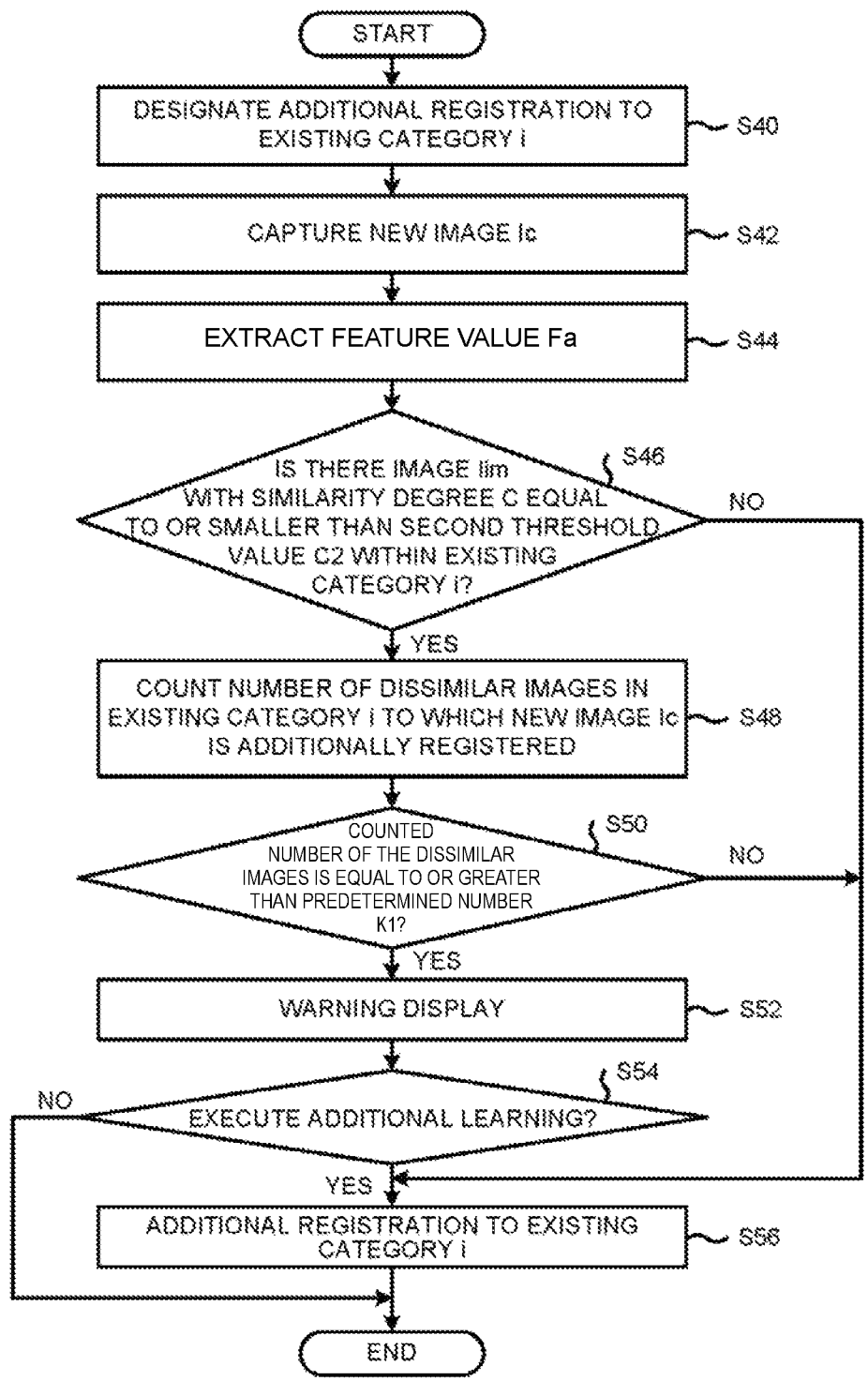
FIG. 7 is a flowchart illustrating a flow of additionally registering a new image to an existing category of the commodity reading apparatus.

Next, with reference to FIG. 7, the flow of an operation in which the commodity reading apparatus of the present embodiment additionally registers the new image Ic in the existing category i of the PLU file F1 serving as the storage module 71 is described. FIG. 7 is a flowchart illustrating the processing for additionally registering the new image Ic in the existing category i of the PLU file F1. First, in Act S40, the designation module 50 designates that the additional registration of the new image Ic in the existing category i is executed based on, for example, the operation input to the touch panel 105 or the keyboard 107 of the display and operation unit 110 (FIG. 1) by the store clerk. Specifically, the designation module 50 designates the existing category i and the learning target article, i.e., a commodity to be additionally registered.

Next, in Act S42, the image capturing module 51 captures the new image Ic to be additionally registered in the existing category i of the PLU file F1.

Subsequently, in Act S44, the extraction module 53 extracts the feature value Fa from the captured new image Ic.

In Act S46, the calculation module 72 first calculates the similarity degree C. between the feature value Fb registered in the existing category i of the PLU file F1 and the feature value Fa of the new image Ic to be additionally registered in the existing category i. The determination module 74 then determines whether there is an image Iim having the feature value Fa and the similarity degree C. equal to or smaller than a second threshold value C2 in the existing category i. The second threshold value C2 may be set to an arbitrary value lower than the first threshold value C1, but it is desirable to set the second threshold value C2 to a relatively low value (for example, 20% if the similarity degree C. is calculated with the relative evaluation). If it is determined that there is the image Iim having the similarity degree C. equal to or smaller than the second threshold value C2 (Yes in Act S46), the flow proceeds to the processing in Act S48, otherwise the flow proceeds to the processing in Act S56 (No in Act S46).

Subsequently, in Act S48, the calculation module 72 counts the number of images (hereinafter, referred to as a dissimilar image) having the similarity degree C., when compared to the new image Ic, equal to or smaller than the second threshold value C2 among the images Iim already registered in the existing category i to which the new image Ic is additionally registered.

In Act S50, the determination module 74 determines whether or not there are the images, which are dissimilar to the new image Ic, more than a predetermined number of images K3 in the existing category i based on the counting result in Act S48. If it is determined that the number of images, which is dissimilar to the new image Ic, in the existing category is equal to or greater than K3 (Yes in Act S50), the flow proceeds to the processing in Act S 52, otherwise the flow proceeds to the processing in Act S56 (No in Act S50). Since the number of images Iim registered in the existing category i varies depending on cases, the number of images K3 used for the determination in Act S50 accounts for a predetermined ratio or more of the total number of images registered in the existing category i (for example, 15% or more).

In Act S50, if it is determined that there are the dissimilar images more than the number of images K3 in the existing category i, the determination module 74 issues an instruction to the notification module 54 to execute notification by the warning display in Act S52. Then, the notification module 54 informs that there is a possibility of degrading the recognition performance of the recognition module 73 if the new image Ic is additionally registered in the existing category i. After that, the commodity reading apparatus 1 executes the processing in Act S54.

Subsequently, in Act S54, the learning module 75 determines whether to execute the additional learning to register the new image Ic in the existing category i. If the additional learning is executed (Yes in Act S54), the flow proceeds to the processing in Act S56, otherwise the commodity reading apparatus 1 ends the processing in FIG. 7 (No in Act S54). The learning module 75 executes the additional learning if the determination module determines that the recognition performance of the recognition module 73 is not likely to be degraded. Thus, the learning module 75 does not execute the additional learning if the determination module 74 determines that there is a possibility of degrading the recognition performance of the recognition module 73.

In Act S56, the learning module 75 additionally registers the new image Ic and the feature value Fa of the new image Ic in the existing category i of the PLU file F1 serving as the storage module 71. The feature value Fa is registered as the second feature value Fb in the PLU file F1, and then the commodity reading apparatus 1 ends the processing in FIG. 7.

In the flowchart in FIG. 7, in Act S46, the similarity degree C. between the new image Ic and the image Iim registered in the existing category i into which the new image Ic is additionally registered is calculated. Then, in Act S50, the determination module 74 notifies through the notification module 54 that there is a possibility of degrading the recognition performance or there is less possibility of improving the recognition performance if the dissimilar images the number of which is equal to or greater than the number of images K3 present in the images Iim registered in the existing category i. This is because that the feature value Fa extracted from the new image Ic and the feature value Fb extracted from the image Iim become values which are significantly different from each other if the dissimilar image to the image Iim already registered in the existing category presents in the new image Ic additionally registered in the category i, and therefore, increasing the possibility of erroneously recognizing the commodity G belonging to the existing category i as the commodity registered in another category at the time the recognition module 73 executes the object recognition.

The determination processing executed in Act S46 and Act S50 may be further simplified. In Act S46, if the image Iim having the similarity degree equal to or smaller than the second threshold value C2 is found (Yes in Act S46) at the time the similarity degree C. between the new image Ic additionally registered and the image Iim registered in the existing category I is calculated, the determination module 74 may notify through the notification module 54 that there is a possibility of degrading the recognition performance of the recognition module 73. In this case, in the flowchart in FIG. 7, execution of the processing in Act S48 and S50 are not required.

The flowchart shown in FIG. 7 depicts an example in which only one new image Ic is additionally registered, but the number of new images Ic additionally registered is not limited to one. After the processing in Act S56 is executed, it is determined whether another new image Ic is additionally registered, and then if the additional registration is required, the flow returns to the processing in Act S42 and the processing in FIG. 7 may be repeated in the same way as stated above. Incidentally, if additionally registering a plurality of new images Ic, the determination module 74 determines whether there are the new images Ic having the similarity degree C. equal to or greater than the third threshold value C3 the number of images of which is equal to or greater than a predetermined number of images K2 in the plurality of new images Ic, and if there are the new images Ic the number of images of which is equal to or greater than the predetermined number of images K2, the determination module 74 may notify through the notification module 54 that there is a possibility of degrading the recognition performance or there is less possibility of improving the recognition performance. The processing described above corresponds to the processing described in Act S22 and S24 in FIG. 5.

Furthermore, the determination module 74 may determine whether there is a possibility of degrading the recognition performance for the existing category i or there is less possibility of improving the recognition performance therefor if the new image Ic is additionally registered based on the similarity degree C. between the new image Ic and the image registered in the existing category in which the new image Ic is not additionally registered. In a case in which there are many images similar to the new image Ic in the existing category in which the new image Ic is not additionally registered, it can be determined that there is a possibility of degrading the recognition performance of the existing category i if the new image Ic is additionally registered in the existing category i. Furthermore, it can be determined that there is a possibility of reducing, likewise, the recognition performance for the existing category i in which an image similar to the new image Ic presents. For example, the processing described above can be executed with the processing in Acts S16 and S18 in FIG. 5.

Figure 8:
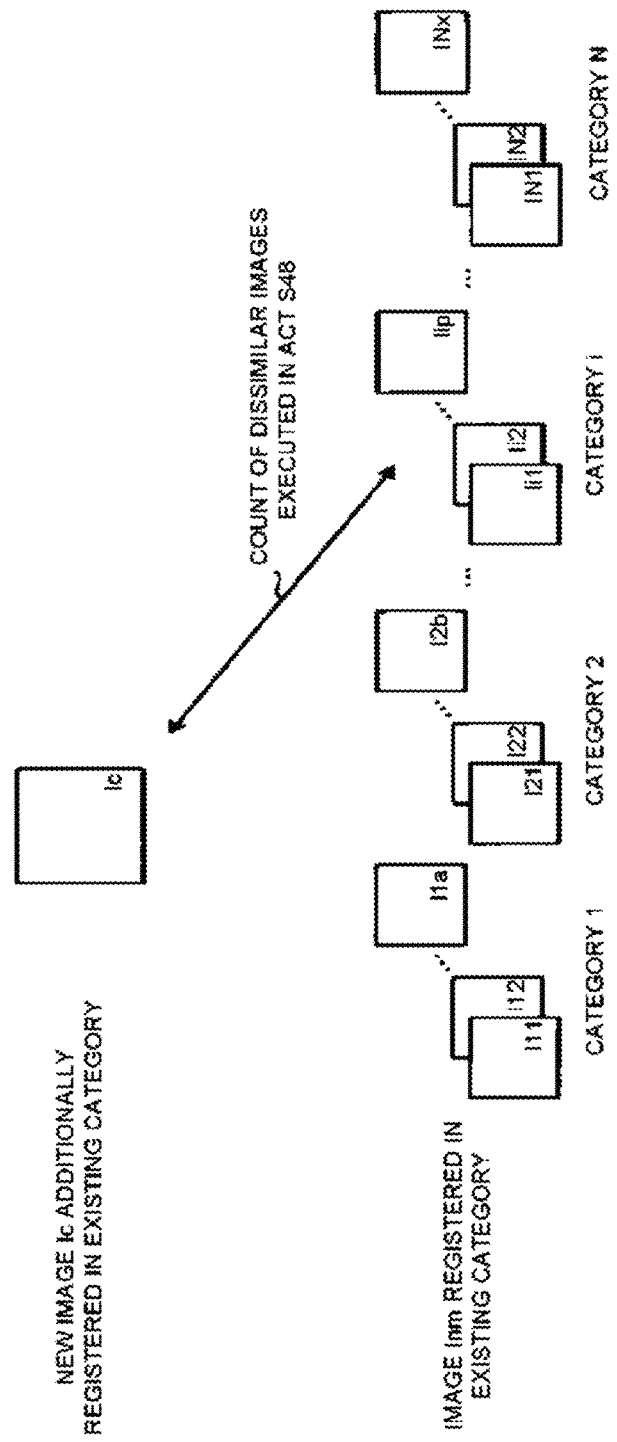
FIG. 8 is a diagram illustrating a method of counting the number of dissimilar images executed in the flowchart in FIG. 7.

The method of counting the number of dissimilar images executed in Act S48 is described in more detail with reference to FIG. 8. FIG. 8 is a diagram illustrating the counting method of the number of dissimilar images.

As shown in FIG. 8, in Act S48 (FIG. 7), the calculation module 72 calculates the similarity degree C. between the new image Ic and the image Iim registered in the existing category i to which the new image Ic is registered. Then, the calculation module 72 counts the number of images Iim having the similarity degree C. equal to or smaller than the second threshold value C2.

If images of number of images p are registered in the existing category i, the calculation module 72 calculates the similarity degree by p times in Act S48.

As described above, according to the commodity reading apparatus 1 of the present embodiment, the designation module 50 designates the commodity G as the learning target article. Then, the extraction module 53 extracts the feature value Fa indicating the feature of the learning target article from the image of the commodity G. Subsequently, the calculation module 72 compares the feature value Fa extracted by the extraction module 53 with the feature value Fb indicating the feature of each registered commodity in the dictionary PLU file F1 serving as a storage module 71 to calculate the similarity degree C. therebetween. The determination module 74 determines whether the similarity degree C. between the feature value Fa and the feature value Fb of the registered commodities excluding the commodity G is equal to or greater than the first threshold value C1 or the similarity degree C. between the feature value Fa and the feature value Fb of the registered commodities including the commodity G is equal to or smaller than the second threshold value C2 lower than the first threshold value C1. Then, on condition that the determination module 74 executes the determination described above, the notification module 54 executes the notification before the learning module 75 carries out the learning processing of registering the feature value Fa extracted by the extraction module 53 as the feature value Fb of the learning target article in the storage module 71. Therefore, it can avoid additionally registering the commodity G, which may reduce (degrade) the recognition performance, in the storage module 71.

According to the commodity reading apparatus 1 of the embodiment, the storage module 71 stores a plurality of feature values Fb for each registered commodity. The notification module 54 then executes notification on condition that there is the feature value Fb having the similarity degree C. to the feature value Fa equal to or greater than the first threshold value C1 or equal to or smaller than the second threshold value C2 in the feature values Fb for each registered commodity. Therefore, at the time the designation module 50 designates the learning target article, it can reliably determine that there is a possibility of degrading the recognition performance through a simple calculation as described above.

Furthermore, according to the commodity reading apparatus 1 of the embodiment, the storage module 71 stores a plurality of the feature value Fb for each registered commodity. The notification module 54 then executes notification on condition that there are images Io, having the feature value Fb whose similarity degree C. to the feature value Fa is equal to or greater than the first threshold value C1 in the feature values Fb for each registered commodity, the number of images of which is equal to or greater than K1 (which is a predetermined number). The notification module 54 also executes notification on condition that there are new images Ic, having the feature value Fb whose similarity degree C. to the feature value Fa is equal to or smaller than the second threshold value C2 in the feature values Fb for each registered commodity, the number of images of which is equal to or greater than K3 (which is a predetermined number). Therefore, it can more reliably determine that there is a possibility of degrading the recognition performance at the time the designation module 50 designates the learning target article through the simple calculation.

According to the commodity reading apparatus 1 of the embodiment, the extraction module 53 extracts the feature value Fa from each of the plurality of images Io obtained by photographing the commodity. Then, the calculation module 72 calculates the similarity degree C. between the feature values Fa extracted by the extraction module 53. The notification module 54 executes notification on condition that the similarity degree C. between the feature value Fa and the feature value Fb of the registered commodities excluding the commodity G is equal to or greater than the first threshold value C1 or the similarity degree C. between the feature value Fa and the feature value Fb of the registered commodities including the commodity G is equal to or smaller than the second threshold value C2 and there are images Io, having the feature value Fa whose similarity degree C. in the feature values Fa is equal to or greater than the third threshold value C3, the number of images of which is equal to or greater than K2 (which is a predetermined number). Therefore, it can reliably determine that there is a possibility of degrading the recognition performance or there is less possibility of improving the recognition performance.

According to the commodity reading apparatus 1 of the embodiment, the designation module 50 designates the commodity G of the category not registered in the PLU file F1 by the storage module 71 as the learning target article of the new category. The designation module 50 designates the commodity G belonging to the existing category as the learning target article in the existing category stored in the storage module 71. Therefore, it can easily add or change the commodity G subject to be read.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the embodiment, the commodity reading apparatus 1 registers both the image Inm and the feature value Fb in the PLU file F1, but the commodity reading apparatus 1 may register either one of the image Inm and the feature value Fb. Only the feature value Fb may be registered in the PLU file F1, and the feature value Fb may be calculated as required after only the image Inm is registered in the PLU file F1. However, if the additional registration of the new category is expected for the commodity reading apparatus 1, there is a case in which it occurs that use of a new feature value Fb unknown ever before is required to improve the recognition performance for each registered category. If the new feature value Fb is used, it is necessary to calculate the new feature values Fb from the already registered images of the commodity G. Therefore, it is desirable to register at least the image Inm of the commodity G.

In the embodiment, the commodity reading apparatus 1 uses one type of the feature value as the first feature value Fa and the second feature value Fb, respectively; however, the type of the used feature value is not limited to one type. In other words, a plurality of types of the feature value is used and it may recognize the commodity G with the combination of the values of the plural feature values.

In the embodiment, the flowcharts in FIG. 5 and FIG. 7 are described independently, but these two flowcharts may be used in combination. For example, it may be constituted to switch between the additional registration to the new category and the additional registration to the existing category according to the designation by the designation module 50.

What is claimed is:

1. An object recognition system, comprising:
    a storage device in which a dictionary containing attributes of a plurality of registered objects is stored, the attributes including at least a category and feature values;
    a reading unit including an image capturing device;
    an output device; and
    a processor configured to register a new object by

19

(i) extracting a feature value of the new object from an image of the new object captured by the image capturing device,
(ii) comparing the extracted feature value with feature values of registered objects that are registered in the dictionary to calculate a similarity degree therebetween,
(iii) registering the extracted feature value in the dictionary as a determination criteria for an object recognition, and
(iv) outputting a notification through the output device prior to the registering, upon a result of the comparing meets a predetermined condition, wherein in a case where the extracted feature value of the image of the new object is subjected to addition to the dictionary as a new category,
the processor is further configured to perform:
   causing the image capturing device to capture a plurality of images of the new object;
   comparing the extracted feature value with feature values of objects registered corresponding to existing categories in the dictionary to calculate a first similarity degree therebetween;
   comparing the feature values extracted with regard to the plurality of images of the new objects to calculate a second similarity degree therebetween; and
   outputting a notification through the output device prior to the registering, when the number of the images, which has a first similarity degree higher than a first threshold, is greater than a first predetermined number, and when the number of the images, which has a second similarity degree higher than a second threshold, is greater than a second predetermined number.

2. The system according to claim 1, wherein
the processor further configured to perform:
   after outputting the notification, receiving an operation input to designate whether registering the extracted feature value in the dictionary by an operator,
   registering the extracted feature value in the dictionary as a determination criteria for an object recognition, if an operation input to designate registering the extracted feature value in the dictionary is received.

3. The system according to claim 1, wherein
in a case where the extracted feature value of the image of the new object is subjected to addition to any one of existing categories already registered in the dictionary,
the processor further configured to perform:
   comparing the extracted feature value with feature values of objects registered corresponding to the existing category, which is subjected to the addition of the new object, in the dictionary to calculate a similarity degree therebetween, and
   outputting a notification through the output device prior to the registering, when the number of the images, which has a similarity degree lower than a predetermined threshold, is greater than a predetermined number.

4. The system according to claim 1, wherein
the feature value is a surface state of the object extracted from the image of the object captured by the image capturing device.

5. The system according to claim 4, wherein
the feature value is an unevenness of the surface of the object extracted from the image of the object captured by the image capturing device.

20

6. The system according to claim 4, wherein
the feature value is a tint of the surface of the object extracted from the image of the object captured by the image capturing device.

7. The system according to claim 1, wherein
the attributes further include an ID, a name, and an image.

8. A method of registering a new object in an object recognition system having a storage device in which a dictionary containing attributes of a plurality of registered objects is stored, the attributes including at least a category and feature values, a reading unit including an image capturing device, and an output device, said method comprising:
   capturing an image of the new object using the image capturing device;
   extracting a feature value of the new object from the image of the new object;
   comparing the extracted feature value with feature values of registered objects that are registered in the dictionary to calculate a similarity degree therebetween;
   registering the extracted feature value in the dictionary as a determination criteria for an object recognition; and
   outputting a notification through the output device prior to the registering, upon a result of the comparing meets a predetermined condition, wherein in a case where the extracted feature value of the image of the new object is subjected to addition to the dictionary as a new category,
the method further comprising:
   causing the image capturing device to capture a plurality of images of the new object;
   comparing the extracted feature value with feature values of objects registered corresponding to existing categories in the dictionary to calculate a first similarity degree therebetween;
   comparing the feature values extracted with regard to the plurality of images of the new objects to calculate a second similarity degree therebetween; and
   outputting a notification through the output device prior to the registering, when the number of the images, which has a first similarity degree higher than a first threshold, is greater than a first predetermined number, and when the number of the images, which has a second similarity degree higher than a second threshold, is greater than a second predetermined number.

9. The method according to claim 8, wherein the method further comprising:
   after outputting the notification, receiving an operation input to designate whether registering the extracted feature value in the dictionary by an operator,
   registering the extracted feature value in the dictionary, if an operation input to designate registering the extracted feature value in the dictionary is received.

10. The method according to claim 8, wherein
in a case where the extracted feature value of the image of the new object is subjected to addition to any one of existing categories already registered in the dictionary,
the method further comprising:
   comparing the extracted feature value with feature values of objects registered corresponding to the existing category, which is subjected to the addition of the new object, in the dictionary to calculate a similarity degree therebetween, and
   outputting a notification through the output device prior to the registering, when the number of the images, which has a similarity degree lower than a predetermined threshold, is greater than a predetermined number.

11. The method according to claim 8, wherein the feature value is a surface state of the object extracted from the image of the object captured by the image capturing device.

12. The method according to claim 11, wherein the feature value is an unevenness of the surface of the object extracted from the image of the object captured by the image capturing device.

13. The method according to claim 11, wherein the feature value is a tint of the surface of the object extracted from the image of the object captured by the image capturing device.

14. The method according to claim 8, wherein the attributes further include an ID, a name, and an image.

* * * * *